US009131804B2

(12) United States Patent
Turner et al.

(10) Patent No.: US 9,131,804 B2
(45) Date of Patent: Sep. 15, 2015

(54) TOASTER WITH KEEP WARM FEATURE AND METHOD OF TOASTING WITH THE SAME

(71) Applicant: Hamilton Beach Brands, Inc., Glen Allen, VA (US)

(72) Inventors: Mark Francis Turner, Mechanicsville, VA (US); Drew Carlson, Henrico, VA (US)

(73) Assignee: Hamilton Beach Brands, Inc., Glen Allen, VA (US)

(*) Notice: Subject to any disclaimer, the term of this patent is extended or adjusted under 35 U.S.C. 154(b) by 0 days.

(21) Appl. No.: 13/757,942

(22) Filed: Feb. 4, 2013

(65) Prior Publication Data
US 2014/0220210 A1 Aug. 7, 2014

(51) Int. Cl.
A47J 27/62 (2006.01)
A47J 37/08 (2006.01)
G05D 23/19 (2006.01)

(52) U.S. Cl.
CPC .............. *A47J 37/0814* (2013.01); *A47J 37/08* (2013.01)

(58) Field of Classification Search
CPC ... A47J 37/0814; A47J 37/0821; A47J 37/08; A23L 1/0128
USPC ........... 99/327, 329 P, 329 RT, 335, 389, 391, 99/393
See application file for complete search history.

(56) References Cited

U.S. PATENT DOCUMENTS

| | | |
|---|---|---|
| 1,839,539 A | 1/1932 | Fageros |
| 1,914,649 A | 6/1933 | Reinhardt |
| 2,059,440 A | 11/1936 | Connolly et al. |
| 2,465,577 A | 3/1949 | Cox |
| 2,862,441 A | 12/1958 | Schmall |
| 3,074,342 A | 1/1963 | Wachtel |
| 3,140,650 A * | 7/1964 | Woron .................. 99/329 R |
| 3,253,536 A | 5/1966 | Chivers |
| 4,404,899 A | 9/1983 | Weiss |
| 5,088,389 A | 2/1992 | delFresno |
| 5,088,399 A | 2/1992 | Cacace et al. |
| 5,193,439 A | 3/1993 | Finesman et al. |
| 5,644,974 A | 7/1997 | Slavin |
| 5,647,270 A | 7/1997 | Rousseau et al. |
| 5,694,831 A | 12/1997 | Haroun et al. |
| 5,901,638 A * | 5/1999 | Houel ...................... 99/327 |
| 5,947,006 A | 9/1999 | Mauffrey |
| D440,460 S | 4/2001 | Davis et al. |
| 6,240,834 B1 * | 6/2001 | Chen et al. ............... 99/327 |
| 6,250,212 B1 | 6/2001 | Yeung et al. |

(Continued)

*Primary Examiner* — Dana Ross
*Assistant Examiner* — Hemant Mathew
(74) *Attorney, Agent, or Firm* — Alexander D. Raring

(57) ABSTRACT

A toaster comprises a housing, at least one spring-loaded bread tray, one or more heating elements, a bread tray retaining mechanism, a bread tray partial retaining mechanism, and a lifter arm slot. The bread tray is movable between an up position and a down position and is biased toward the up position. The bread tray retaining mechanism selectively retains the bread tray in the down position while the toasting operation is in progress and releases the bread tray from the down position when the toasting operation is complete. The bread tray partial retaining mechanism selectively retains the bread tray in a position between the down position and the up position after the bread tray is released by the bread tray retaining mechanism. In one embodiment, the lifter arm slot comprises an upper portion and a lower portion, the lower portion being wider than the upper portion.

15 Claims, 10 Drawing Sheets

(56) References Cited

U.S. PATENT DOCUMENTS

| | | |
|---|---|---|
| 6,305,273 B1 | 10/2001 | Sherman |
| D474,640 S | 5/2003 | Holderfield et al. |
| 6,753,150 B2 | 6/2004 | Schmidt et al. |
| D509,702 S | 9/2005 | Picozza et al. |
| 7,013,798 B2 | 3/2006 | Arnedo et al. |
| 7,351,939 B2 | 4/2008 | Boyle et al. |
| 2004/0144257 A1 | 7/2004 | Battu |
| 2004/0149141 A1* | 8/2004 | Arnedo et al. .............. 99/391 |
| 2006/0201334 A1 | 9/2006 | Belanger |
| 2011/0132202 A1* | 6/2011 | Zhang et al. ............... 99/332 |

* cited by examiner

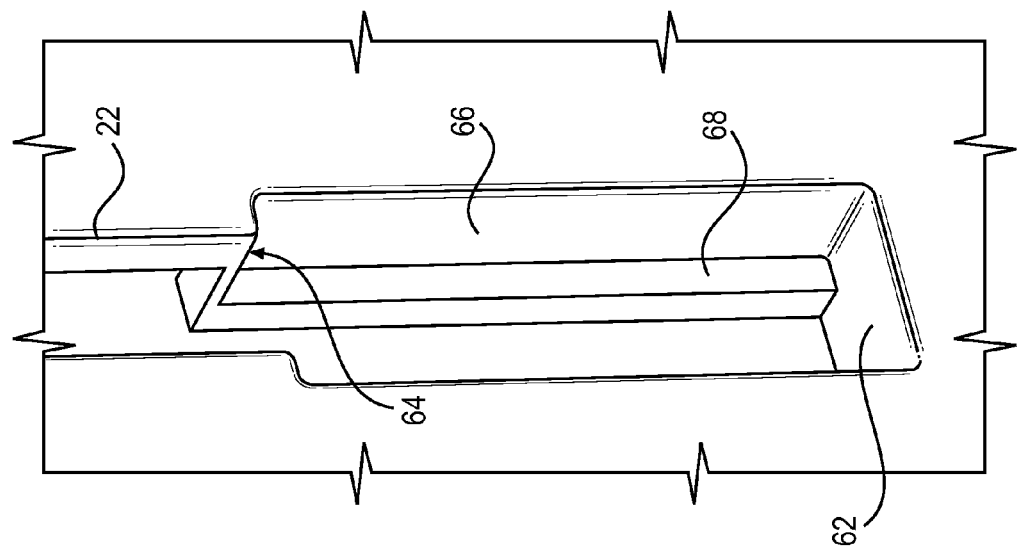
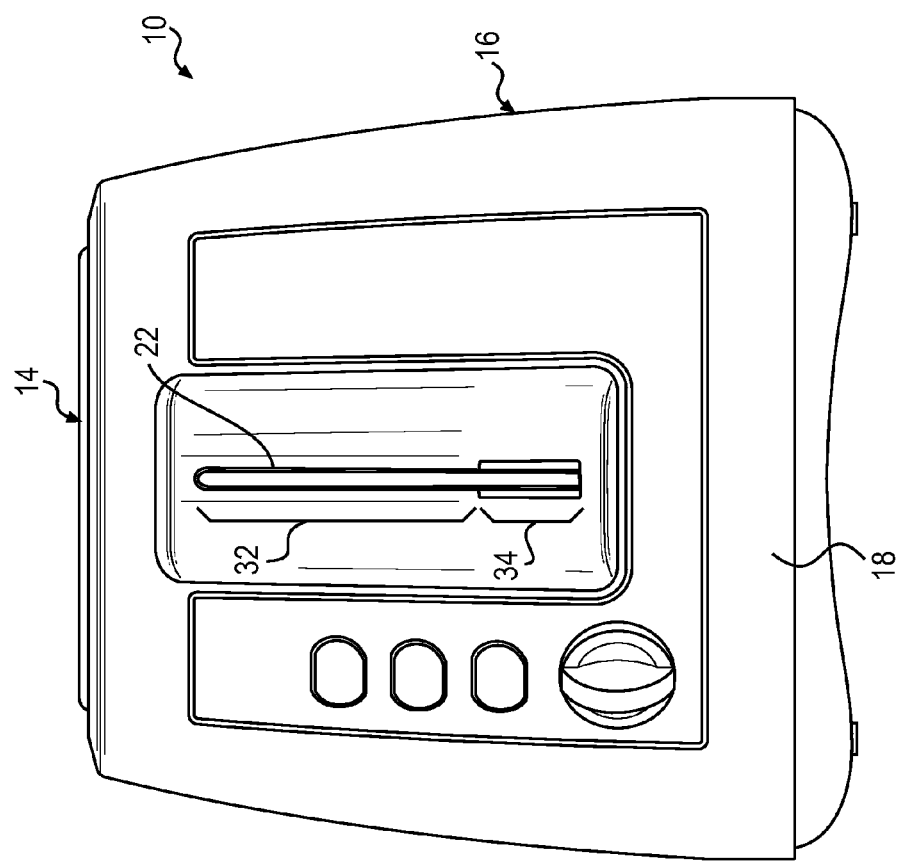

TOASTER WITH KEEP WARM FEATURE AND METHOD OF TOASTING WITH THE SAME

FIELD OF THE INVENTION

The present invention relates generally to appliances, and more particularly to toasters.

BACKGROUND OF THE DISCLOSURE

Pop-up toasters are well known. Conventional pop-up toasters generally have at least one spring-loaded bread tray contained within a housing. The bread tray holds a bread product (e.g., slice of bread, one half of an English muffin, one half of a bagel, etc.) or other similar food product while one or more heating elements apply heat to the bread product, thereby toasting the bread product. The bread tray is movable between an up position and a down position and biased toward the up position. In the up position, the bread product may be inserted into the bread tray. When in the up position, the bread product protrudes at least partially from the top of the toaster.

After the bread product is inserted into the bread tray, a user lowers the bread tray to the down position by way of a lifter knob. The lifter knob is typically external to the housing and affixed to the bread tray by way of a lifter arm and lifter bracket. When the bread tray is lowered to the down position, an electrical circuit is completed which starts a toast cycle and applies power to the heating elements and an electromagnet. The energized electromagnet attracts a metal plate affixed to the lifter bracket, thereby retaining the bread tray in the down position.

When the toast cycle is complete, the electromagnet is de-energized thereby releasing the bread tray. Because the bread tray is biased toward the up position, the bread tray returns to the up position. As the bread tray leaves the down position, the electrical circuit is broken and power is removed from the heating elements. Once in the up position, the now-toasted bread (called toast), which protrudes at least partially from the top of the toaster, may be removed from the toaster.

Once the toast cycle is complete, the heating elements are off, and the toast is at least partially protruding from the toaster, the toast rapidly cools. If the user does not quickly retrieve the toast from the toaster, the toast will cool to a temperature that may be undesirable. Some prior art pop-up toasters feature a keep-warm feature that helps slow the cooling of the toast by either retaining the bread tray in the down position after the toast cycle is complete or returning the bread tray to the down position after a predefined period of time has lapsed. However, the keep-warm feature of these prior art toasters necessitate complex and often costly changes to the structure and function of the above-described conventional pop-up toasters.

It has heretofore not been discovered how to create a toaster that is capable of toasting a bread product and slowing the cooling of the toast after the toast cycle is complete without requiring overly complex and costly changes to the structure and function of a conventional pop-up toaster.

The toaster of the following disclosure accomplishes the above and other objectives and overcomes at least the above-described disadvantages of conventional toaster and methods of toasting.

BRIEF SUMMARY OF THE DISCLOSURE

A kitchen appliance for toasting bread products and the like is disclosed herein. In one embodiment of the subject appliance, the toaster comprises a housing, at least one spring-loaded bread tray, one or more heating elements, a bread tray retaining mechanism, a bread tray partial retaining mechanism, and a lifter arm slot. The housing has at least one bread-receiving slot defined in a top surface. The at least one spring-loaded bread tray is movable between an up position and a down position, is biased toward the up position, and has an open top aligned with the at least one bread-receiving slot. The one or more heating elements selectively apply heat to a bread slice in the bread tray during a toasting operation. The bread tray retaining mechanism selectively retains the at least one bread tray in the down position while the toasting operation is in progress and releases the at least one bread tray from the down position when the toasting operation is complete. The bread tray partial retaining mechanism selectively retains the at least one bread tray in a position between the down position and the up position after the at least one bread tray is released by the bread tray retaining mechanism. The lifter arm slot is defined in a side surface of the housing and comprises an upper portion and a lower portion, the lower portion being wider than the upper portion.

The position between the down position and the up position at which the bread tray partial retaining mechanism is configured to retain the at least one bread tray may be selected such that most or all of the bread slice in the bread tray is within the housing while the bread tray is retained at the position.

The bread tray partial retaining mechanism may have an engaged position and a disengaged position. The bread tray partial retaining mechanism retains the at least one bread tray in the position between the down position and the up position when the bread tray partial retaining mechanism is in the engaged position. The bread tray partial retaining mechanism does not retain the at least one bread tray in the position between the down position and the up position when the bread tray partial retaining mechanism is in the disengaged position, thereby enabling the bread tray to return to the up position.

The bread tray partial retaining mechanism may comprise a sliding tab having a distal end sized for selective insertion into the lower portion of the lifter arm slot only such that the bread tray cannot return to the up position from the down position when the sliding tab is inserted into the lower portion of the lifter arm slot.

The toaster may further comprise a lifter bracket, lifter knob and lifter arm. The lifter bracket is located within the housing and affixed to the at least one bread tray. The lifter knob is located external to the housing and comprises the sliding tab. The lifter arm has a first end affixed to the lifter bracket, a second end affixed to the lifter knob, and a connecting portion therebetween, the connecting portion configured to pass through the lifter arm slot. The lifter knob may comprise the sliding tab. Alternatively, the sliding tab may be slidably affixed to one of the lifter knob or the lifter arm.

The lifter bracket may comprise a metal plate and the bread tray retaining mechanism may comprise an electromagnet that is energized during the toasting operation and thereby attracts the metal plate.

The position between the down position and the up position may correspond to a point at which the lower portion and the upper portion of the lifter arm slot meet.

In addition to the toaster, as described above, other embodiments of the invention are directed to a method for toasting a food item. Such a method comprises (1) inserting a bread slice into at least one spring-loaded bread tray of a toaster, the at least one bread tray being movable between an up position and a down position and biased toward the up position; (2)

moving the at least one bread tray from the up position to the down position, thereby initiating a toasting operation; and (3) engaging a bread tray partial retaining mechanism with a lifter arm slot defined in a side surface of a housing of the toaster, the lifter arm slot comprising an upper portion and a lower portion, the lower portion being wider than the upper portion, thereby retaining the at least one bread tray in a position between the down position and the up position after the at least one bread tray is released from the down position when the toasting operation is complete.

The method may further comprise disengaging the bread tray partial retaining mechanism from the lifter arm slot, thereby releasing the at least one bread tray from the position between the down position and the up position, such that the at least one bread tray returns to the top position.

The bread tray partial retaining mechanism may comprise a sliding tab having a distal end sized for selective insertion into the lower portion of the lifter arm slot only. As such, engaging the bread tray partial retaining mechanism with the lifter arm slot comprises inserting the distal end of the sliding tab into the lower portion of the lifter arm slot.

The position between the down position and the up position at which the at least one bread tray is retained may be selected such that most or all of the bread slice in the bread tray is within the housing while the bread tray is retained at the position.

In one alternative embodiment of the invention, a toaster comprises a housing, at least one spring-loaded bread tray, one or more heating elements, a lifter bracket, a lifter knob located external to the housing, a lifter arm, an electromagnet, and a sliding tab. The housing has at least one bread-receiving slot defined in a top surface and a lifter arm slot defined in a side surface. The lifter arm slot comprises an upper portion and a lower portion, the lower portion being wider than the upper portion. The at least one spring-loaded bread tray is movable between an up position and a down position, is biased toward the up position, and has an open top aligned with the at least one bread-receiving slot. The one or more heating elements selectively apply heat to a bread slice in the bread tray during a toasting operation. The lifter bracket is located within the housing and affixed to the at least one bread tray. The lifter bracket has at least one metal surface. The lifter knob is located external to the housing. The lifter arm has a first end affixed to the lifter bracket, a second end affixed to the lifter knob, and a connecting portion therebetween. The connecting portion is configured to pass through the lifter arm slot. The electromagnet selectively retains the at least one bread tray in the down position while the toasting operation is in progress and releases the at least one bread tray from the down position when the toasting operation is complete. The electromagnet is energized during the toasting operation and thereby magnetically retains the metal surface of the lifter bracket. The sliding tab has a distal end sized for selective insertion into the lower portion of the lifter arm slot only, such that the bread tray cannot return to the up position from the down position when the sliding tab is inserted into the lower portion of the lifter arm slot.

The position between the down position and the up position at which the sliding tab is configured to retain the at least one bread tray may be selected such that most or all of the bread slice in the bread tray is within the housing while the bread tray is retained at the position.

The sliding tab may have an engaged position and a disengaged position. The sliding tab retains the at least one bread tray in the position between the down position and the up position when the sliding tab is in the engaged position. The sliding tab does not retain the at least one bread tray in the position between the down position and the up position when the sliding tab is in the disengaged position, thereby enabling the bread tray to return to the up position.

The distal end of the sliding tab may be selectively inserted into the lower portion of the lifter arm slot when the sliding tab is in the engaged position. The position between the down position and the up position may correspond to a point at which the lower portion and the upper portion of the lifter arm slot meet. The sliding tab may be slidably affixed to one of the lifter knob or the lifter arm.

In another alternative embodiment of the invention, a toaster comprises a housing, at least one spring-loaded bread tray, one or more heating elements, a lifter arm slot defined in a side surface of the housing, a lifter bracket, a lifter knob located external to the housing, a lifter arm, a bread tray retaining mechanism, and a bread tray partial retaining mechanism. The housing has at least one bread-receiving slot defined in a top surface. The at least one spring-loaded bread tray is movable between an up position and a down position, is biased toward the up position, and has an open top aligned with the at least one bread-receiving slot. The one or more heating elements selectively apply heat to a bread slice in the bread tray during a toasting operation. The lifter bracket is located within the housing and affixed to the at least one bread tray. The lifter arm has a first end affixed to the lifter bracket, a second end affixed to the lifter knob, and a connecting portion therebetween, the connecting portion configured to pass through the lifter arm slot. The bread tray retaining mechanism selectively retains the at least one bread tray in the down position while the toasting operation is in progress and releases the at least one bread tray from the down position when the toasting operation is complete. The bread tray partial retaining mechanism selectively retains the at least one bread tray in a position between the down position and the up position after the at least one bread tray is released by the bread tray retaining mechanism. The bread tray partial retaining mechanism comprises a protrusion on either the lifter knob or the lifter arm that selectively engages with a corresponding protrusion or void on the housing to selectively retain the at least one bread tray in a position between the down position and the up position after the at least one bread tray is released by the bread tray retaining mechanism.

The lifter arm slot may comprise an upper portion and a lower portion, the lower portion being wider than the upper portion. The protrusion or void on the housing may comprise the lower portion of the lifer arm slot. The protrusion on either the lifter knob or the lifter arm may comprise a sliding tab having a distal end sized for selective insertion into the lower portion of the lifter arm slot only.

The toaster may further comprise a retaining slot defined in the side surface of the housing parallel to the lifter arm slot and having a length shorter than a length of the lifter arm slot. The protrusion or void on the housing may comprise the retaining slot. The protrusion on either the lifter knob or the lifter arm may comprise a sliding latch having a distal end configured for selective insertion into the retaining slot.

The protrusion or void on the housing may comprise a protrusion on the housing. The protrusion on either the lifter knob or the lifter arm may comprise a sliding latch having a distal end configured for selective engagement with the protrusion on the housing.

BRIEF DESCRIPTION OF THE SEVERAL
VIEWS OF THE DRAWING(S)

Having thus described the invention in general terms, reference will now be made to the accompanying drawings, which are not necessarily drawn to scale. The foregoing summary, as well as the following detailed description of the disclosure, will be better understood when read in conjunction with the appended drawings. It should be understood, however, that the disclosure is not limited to the precise arrangements and instrumentalities shown, wherein:

FIG. 2A is an end view of the toaster of FIG. 1, with the lifter know and lifter arm removed to illustrate the lifter slot.

FIG. 2B is a close-up isometric view of a portion of the end of the toaster of FIG. 2A.

DETAILED DESCRIPTION OF THE DISCLOSURE

Figure 1:
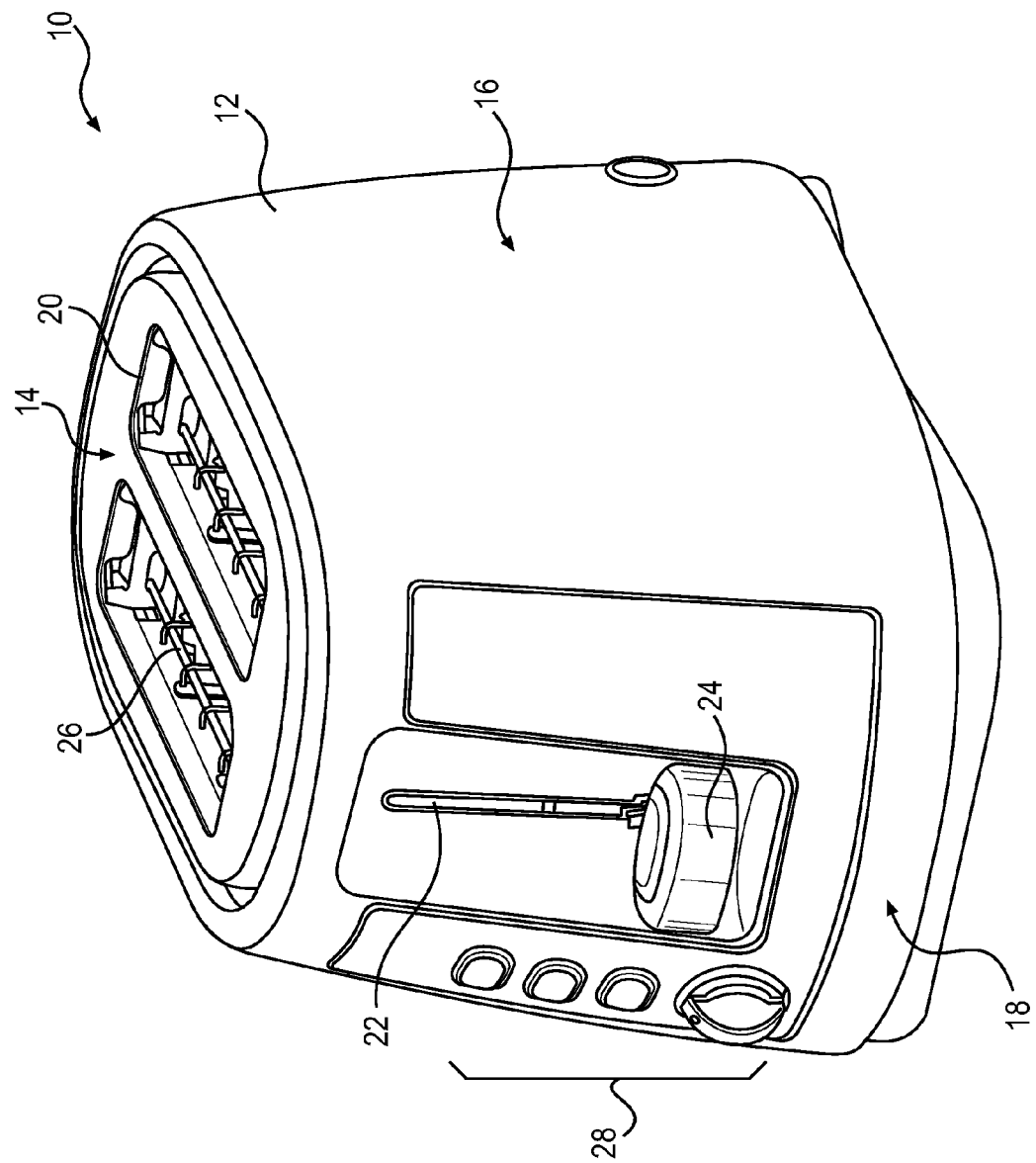
FIG. 1 is an isometric view of a toaster, in accordance with embodiments of the present invention.

Certain terminology is used in the following description for convenience only and is not limiting. The words "lower," "bottom," "upper," and "top" designate directions in the drawings to which reference is made. The words "leftward," "rightward," "up," "upward," "down," and "downward" refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Embodiments of the appliance disclosed herein provide a toaster that enables a user to toast a bread product and to slow the cooling of the toast after the toast cycle is complete, without requiring overly complex and costly changes to the structure and function of a conventional pop-up toaster.

Referring now to FIGS. 1-5 wherein like numerals indicate like elements throughout, there is illustrated a toaster 10 in accordance with an embodiment of the present disclosure. Toaster 10 comprises a housing 12 having a generally cuboid shape, with opposing side surfaces 16, opposing end surfaces 18, a top surface 14, and a bottom surface (not illustrated). Two bread-receiving slots 20 are defined in the top surface 14 of the housing 12 (pop-up toasters generally, but not necessarily, have two or four such slots). A user interface 28 may have a variety of user input and output elements, such as a darkness control and a power light.

Figure 3:
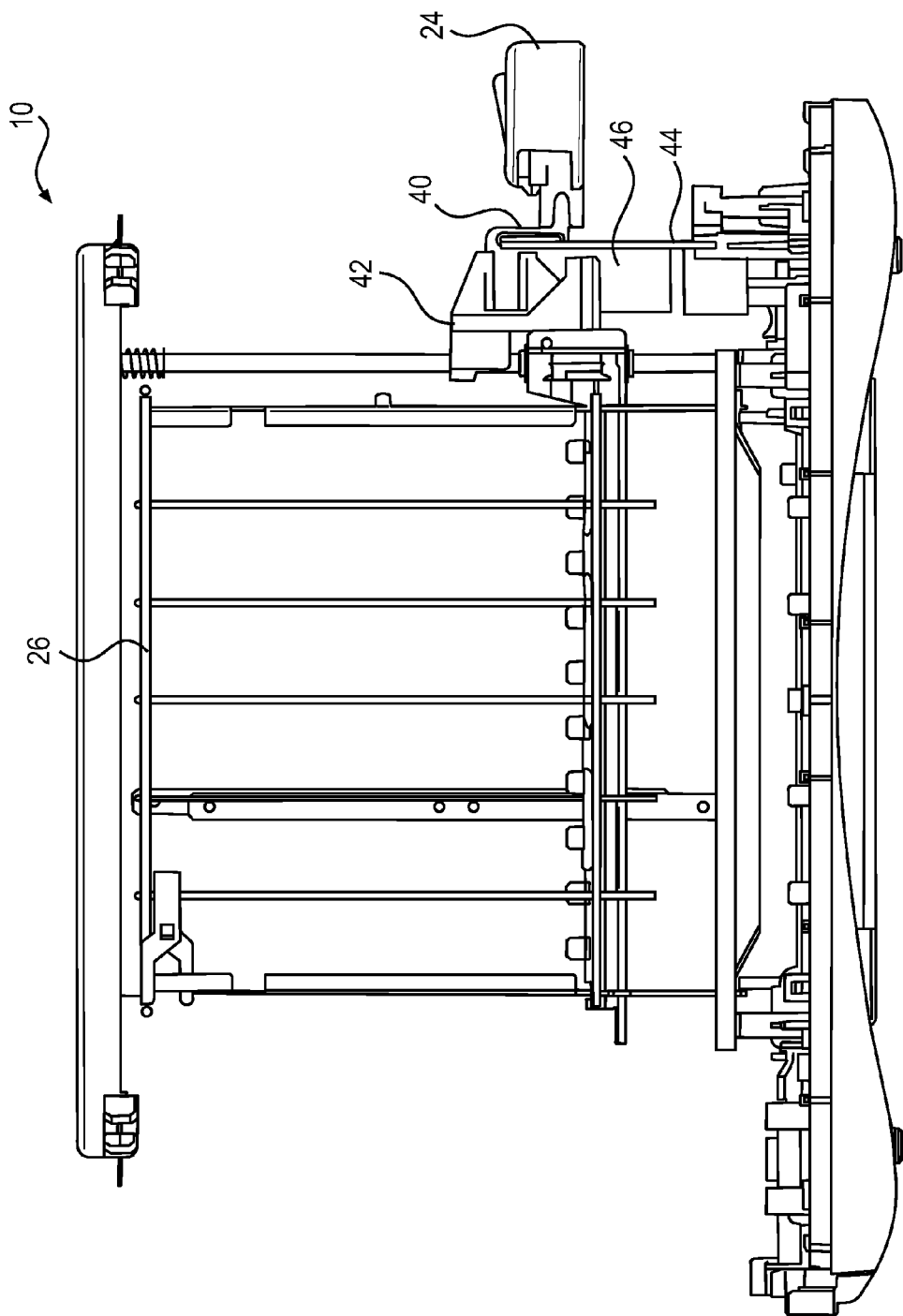
FIG. 3 is a simplified cutaway side view of the toaster of FIG. 1, with the housing and some internal components removed to illustrate other internal components.

Partially seen in FIG. 1, but internal to the housing 12, are two spring-loaded bread trays 26 (more fully illustrated in FIG. 3 and described further below). Each bread tray has an open top aligned with a corresponding bread-receiving slot. As discussed above, each bread tray may hold a bread product (e.g., slice of bread, one half of an English muffin, one half of a bagel, etc.) or other similar food product. The bread tray is movable between an up position and a down position and biased toward the up position. In the up position, the bread product may be inserted into the bread tray. When in the up position, an inserted bread product protrudes at least partially from the top of the toaster. In the down position, one or more heating elements (not illustrated) apply heat to the bread product, thereby toasting the bread product.

Toaster 10 has a substantially vertical lifter arm slot 22 defined in one of the end surfaces 18. Advantageously, the lifter arm slot 22 comprises an upper portion 32 and a lower portion 34, with the lower portion 34 being wider than the upper portion 32, as illustrated in FIG. 2A. The purpose of the wider lower portion 34 is discussed in more detail below. In a conventional toaster, the lifter arm slot comprises an elongated opening of uniform width. The lifter arm slot of a conventional toaster is generally wide enough to enable the lifter arm to move up and down within the slot and is generally narrow enough to reduce the likelihood of foreign objects being inserted through the lifter arm slot. The lifter arm slot of embodiments of the subject disclosure may comprise merely an elongated opening having a wider lower portion, without any additional structure behind the opening of the wider lower portion. However, such an open wider portion could increase the likelihood of foreign objects being inserted through the lifter arm slot (at the wider portion). Accordingly, the lifter arm slot 22 of the illustrated embodiment of FIG. 2B has additional structure behind the opening. As in FIG. 2A, the lifter knob and lifter arm are removed in FIG. 2B to more clearly illustrate the lifter slot. Additionally, FIG. 2B omits for clarity any internal toaster components that would normally be visible through the lifter slot. Behind the opening that constitutes the lower portion 34 of the lifter arm slot 22, a cavity (labeled in FIGS. 5A-D as element 36) is formed by opposing side walls 66 (only one wall is seen in the inset of FIG. 2), opposing bottom wall 62 and top wall 64, and back wall 68. A narrower slot is defined in the back wall 68 and the top wall 64 of the cavity. The narrow slot defined in the back wall 68 and the top wall 64 of the cavity may be, for example, the same width as the upper portion 32 of the lifter arm slot 22. As such, the illustrated structure provides a wider opening at the front of the cavity for receiving a partial bread tray retaining mechanism (as discussed below) and a narrower opening at the rear of the cavity (generally just wide enough to allow the lifter arm to move up and down within that narrower opening) to reduce the likelihood of foreign objects being inserted through the lifter arm slot.

Lifter knob 24 is external to the housing 12 and is connected to a lifter arm 40. Lifter bracket 42 is located within the housing and is connected to the bread trays 26 and is connected to the lifter arm 40. Lifter arm 40 has a first end affixed to the lifter bracket 42, a second end affixed to the lifter knob 24, and a connecting portion therebetween. The connecting portion passes through the lifter arm slot 22, and moves up and down in the lifter arm slot 22 as the bread trays 26 and the lifter knob 24 correspondingly move up and down, as described below. The connection between the lifter knob 24, lifter arm 40, lifter bracket 42, and bread trays 26 are illustrated in FIG. 3. The housing 12 and many other conventional internal components (e.g., heating elements, power cord, transformer, etc.) have been removed in FIG. 3 for clarity.

In use, a user inserts a bread product to be toasted into one or both of the bread trays. The lifter knob 24, by way of its connection to the bread trays, enables a user to lower the bread tray as far down as the bread tray/lifter knob can go, which position may be termed the down position. When the bread tray is lowered to the down position, the lifter bracket moves one or more electrical contacts (not illustrated) on circuit board 44 into contact with one or more corresponding electrical contacts (not illustrated), thereby completing an electrical circuit. The completion of the electrical circuit starts a toast cycle and applies electric power to the heating elements and an electromagnet 46. The energized electromagnet attracts a metal plate (not illustrated) affixed to bottom of the lifter bracket 42, thereby retaining the bread tray 26 in the down position (thus, the metal plate, lifter bracket 42, and electromagnet 46 function together as a bread tray retaining mechanism). When the toast cycle is complete (which may be determined using a thermostatic switch or a timing device or a combination thereof on the circuit board 44), the electromagnet 46 is de-energized thereby releasing the metal plate and correspondingly the lifter bracket 42 and the bread tray 26. Because the bread tray 26 is biased toward the up position, the bread tray 26 moves upward to the up position. As the bread tray leaves the down position, the electrical circuit is broken and electric power is removed from the heating elements. As one of skill in the art would understand, there are some variations on how to retain the bread tray in the down position that would also be operable with the keep-warm feature disclosed and taught herein.

In addition to the operation described in the immediately preceding paragraph, the toaster 10 of the present disclosure includes a novel keep-warm feature. Advantageously, the subject keep-warm feature stops the bread tray 26 from returning all the way to the up position after the toast cycle is complete and the electromagnet 46 is de-energized. Rather, the keep-warm feature retains the bread tray 26 in a position between the down position and the up position. The position between the down position and the up position at which the keep-warm feature retains the bread tray (referred to herein as the "keep-warm position") is selected such that most or all of the bread slice (now toast) in the bread tray 26 is within the housing 12 while the bread tray 26 is retained at the keep-warm position. By keeping most or all of the toast within the housing 12, the residual heat that remains within the housing 12 (even after power is removed from the heating elements) helps keep the toast warm. Additionally, the keep-warm position is selected such that the lifter bracket 42 is far enough above the circuit board 44 such that the lifter bracket 42 is fully separated from the electrical contacts and the electromagnet 26. Accordingly, toaster 10 is not engaged or activated when the toast is in the keep-warm position.

The subject keep-warm mechanism comprises a mechanical retention device for stopping the bread tray 26 from returning all the way to the up position after the toast cycle is complete and retaining the bread tray 26 in the keep-warm position. The keep-warm mechanism may also be termed a "keep-warm retention device" or a "partial bread tray retaining mechanism," as the retention device retains the bread tray in a keep-warm position that is partly between the up and down positions. The keep-warm retention device may be selectively engaged and disengaged, such as by a user. When selectively engaged, the keep-warm retention device stops the bread tray 26 from returning all the way to the up position after the toast cycle is complete and retains the bread tray 26 in the keep-warm position. When selectively disengaged, the keep-warm retention device allows the bread tray to return to the top position either from the keep-warm position, if the retention device had been engaged prior to the end of the toast cycle, or from the down position, if the keep-warm retention device had not been engaged by the end of the toast cycle.

Figure 4A:
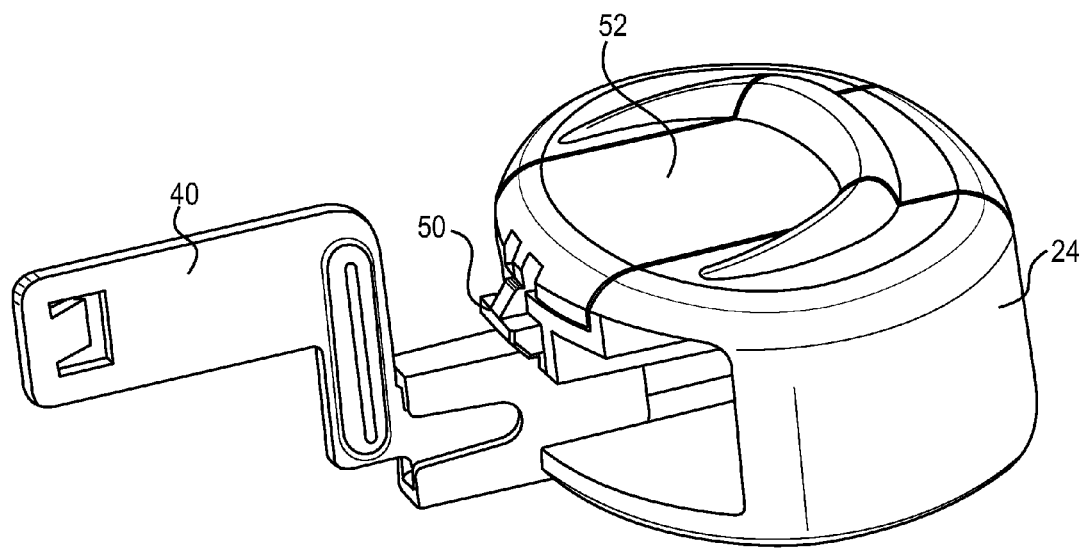
FIGS. 4A and 4B are isometric views of a lifter knob and lifter arm removed from the toaster of FIG. 1.
Figure 4B:
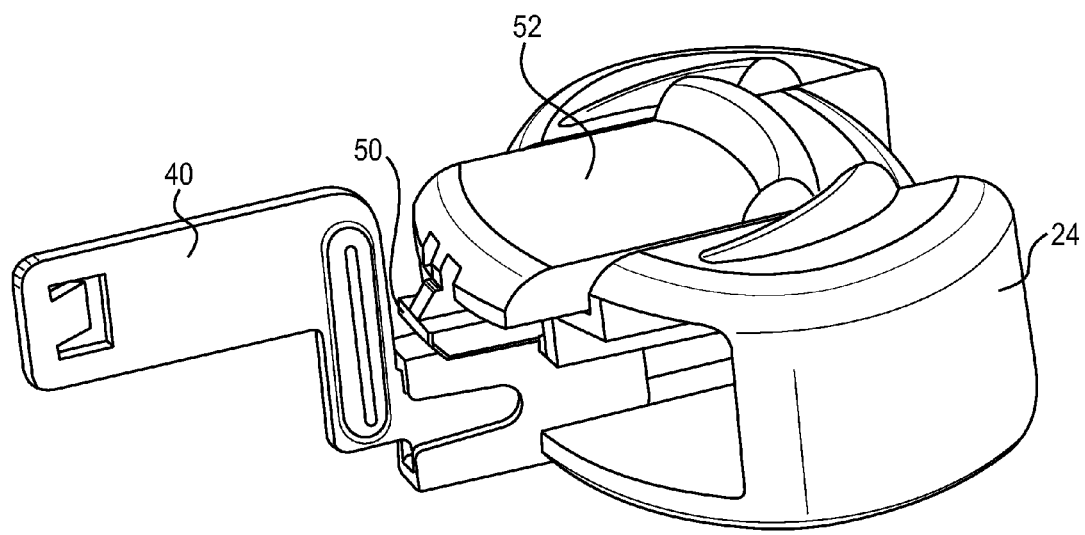

Reference is made now to FIGS. 4A and 4B in which lifter knob 24 and lifter arm 40 are illustrated removed from the toaster 10 for clarity. In accordance with the illustrated embodiment of the invention, the keep-warm retention device comprises a sliding tab 50 that is slidably affixed to the lifter knob 24. In alternative embodiments of the invention (not illustrated), such a sliding tab or other retention device may be affixed to the lifter arm. Sliding tab 50 selectively engages with the lower, wider portion 34 of lifter slot 22, as described in more detail below, to selectively keep the bread tray 26 from returning to the up position and to retain the bread tray 26 in the keep-warm position, at least until the sliding tab 50 is selectively disengaged.

The sliding tab 50 has a disengaged position (see FIG. 4A) and an engaged position (see FIG. 4B). In the engaged position, the sliding tab 50 is slid toward the lifter slot 22 such that the sliding tab 50 may engage the lifter slot 22 (described further below) and retain the bread tray 26 in the keep-warm position. In the disengaged position, the sliding tab 50 is slid away from the lifter slot 22 such that the sliding tab 50 does not engage the lifter slot 22 and does not retain the bread tray 26 in the keep-warm position, thereby enabling the bread tray 26 to return to the up position. In the illustrated embodiment, the sliding tab 50 is integral with or otherwise affixed to sliding body 52. Sliding body 52 is slidably engaged with and forms part of the top surface of lifter knob 24, thereby providing a large, easily manipulable interface for a user. When a user wishes to engage or disengage sliding tab 50, the user slides sliding body 52 in the appropriate direction, thereby in turn sliding the sliding tab 50. Although not illustrated, the sliding body 52, the sliding tab 50, and/or the lifter knob 24 may have one or more "stops" or other suitable mechanical structure for limiting (at one or both ends of the sliding path) the sliding movement of the sliding tab 50 and/or the sliding body 52.

The distal end of the sliding tab 50 (i.e., the end closer to the lifter arm 40) is sized to be able to engage with or be inserted into the lower portion 34 of the lifter arm slot. Further, the distal end of the sliding tab 50 is sized such that it is not able to engage with or be inserted into the upper portion 32 of the lifter arm slot. In other words, the distal end of the sliding tab 50 fits into the lower portion 34 of the lifter arm slot but does not fit into the upper portion 32 of the lifter arm slot.

The operation of toaster 10 and a method for toasting a food item using toaster 10 will now be described with reference to FIGS. 5A-5D. FIGS. 5A-5D are simplified cross-sectional/cutaway side views of the lifter knob 24, lifter arm 40, and lifter arm slot 22 of the toaster of FIG. 1, illustrating various operational positions of the toaster. Specifically, FIGS. 5A-5D illustrate the lifter arm 40 and the lifter knob 24 connected thereto as the lifter arm 40 moves up and down within lifter slot 22 as various steps of a toasting method are performed. The lifter bracket 42 and bread tray 26 (and the rest of the toaster) are omitted for clarity. Additionally, FIGS. 5A-5D illustrate the position of the sliding tab 50 during these various steps of the toasting method.

Figure 5A:
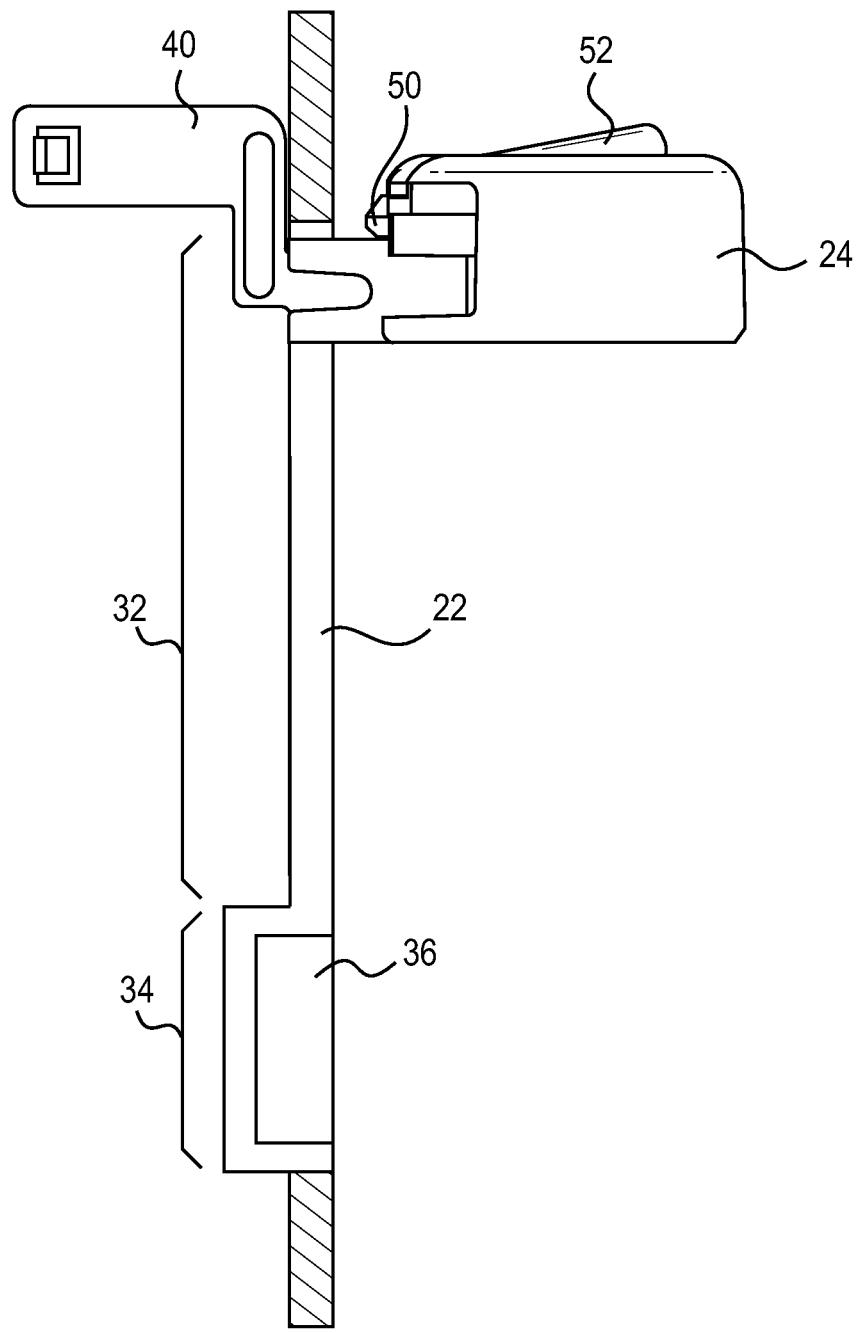
FIGS. 5A-5D are simplified cross-sectional/cutaway side views of the lifter knob, lifter arm, and lifter arm slot of the toaster of FIG. 1, illustrating various operational positions of the toaster.

FIG. 5A illustrates the lifter arm 40 and the lifter knob 24 at the top position. The bread tray 26 (and therefore the attached lifter bracket 42, lifter arm 40 and lifter knob 24) are biased toward this top position. The top of the lifter arm 40 abuts the top of the lifter slot 22, thereby preventing the bread tray 26, the lifter arm 40, and the lifter knob 24 from rising any higher (FIG. 5A shows a small space between the top of the lifter arm 40 and the top of the lifter slot 22 for clarity). The up position illustrated in FIG. 5A is the position at which a bread slice will be inserted into the bread tray 26 by a user prior to toasting and at which the toasted bread slice will be removed from the bread tray 26 by the user.

Figure 5B:
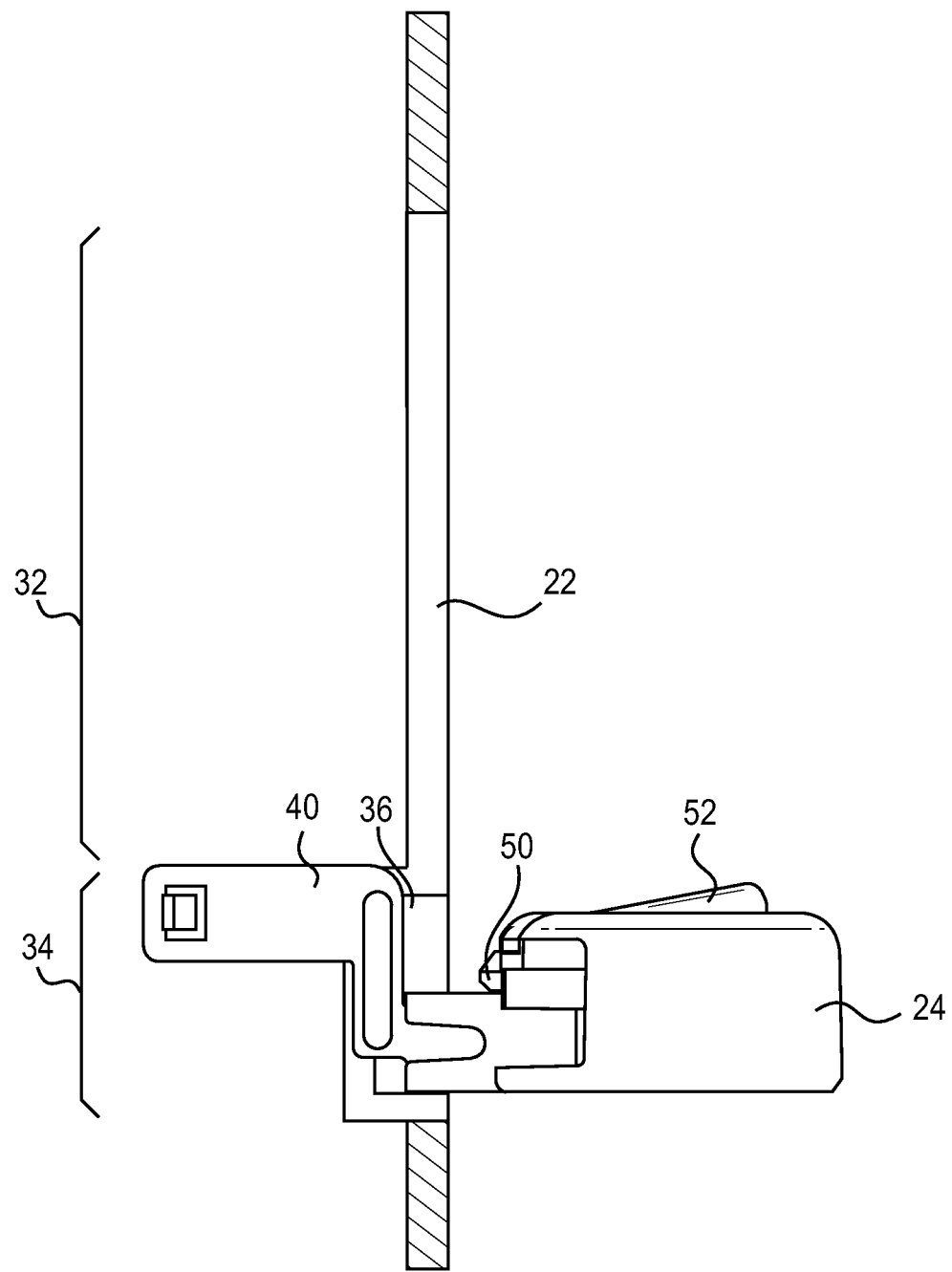

FIG. 5B illustrates the lifter arm 40 and the lifter knob 24 at the bottom position. The bottom position is the position at which the bread slice will be toasted. The user pushes the lifter knob 24 (and therefore the attached lifter arm 40, lifter bracket 42, and bread tray 26) down to the bottom position to commence the toasting cycle. The bottom of the lifter arm 40 abuts or nearly abuts the bottom of the lifter slot 22 when in this position. As described above, the lifter bracket 42 closes an electrical circuit which energizes the heating elements and the electromagnet 46 to retain the bread tray 26 (and therefore the lifter bracket 42, the lifter arm 40, and the lifter knob 24) in the down position while the heating elements toast the bread slice.

Figure 5C:
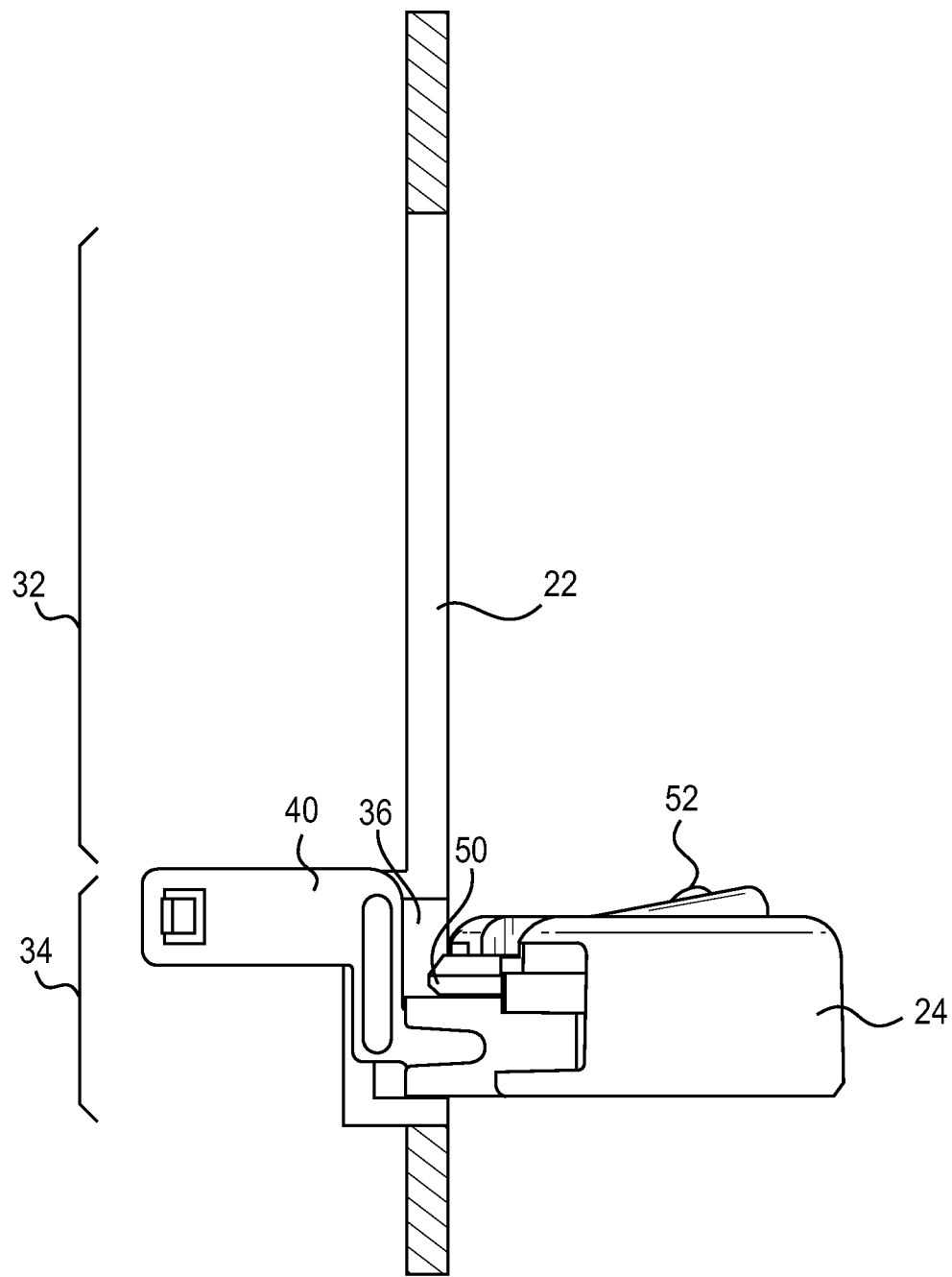

If a user wishes to utilize the keep-warm feature (because, for example, the user expects to be away from the toaster when the toast cycle completes), the user engages the keep-warm retention device. The user engages the keep-warm retention device of the illustrated embodiment by moving sliding body 52 toward the lifter arm 40 (i.e., leftward in FIG. 5) while the bread tray 26 is in (or nearly in) the down position. This movement of the lifting body 52 causes the sliding tab 50 to also move in the same direction, such that the distal end of the sliding tab 50 is inserted in the cavity 36 of the lower portion 34 of the lifter slot 22. FIG. 5C illustrates the lifter arm 40 and the lifter knob 24 at the bottom position, the sliding tab 50 and sliding body 52 moved toward the lifter arm 40, and the distal end of the sliding tab 50 inserted into the cavity 36, such that the keep-warm retention device engaged. The user cannot engage the keep-warm retention device until the sliding tab 50 is at the level of the lower portion 34 of the lifter slot 22 (which occurs when the bread tray 26 is in the down position or nearly in the down position), because the sliding tab 50 is too wide to fit into the upper portion 32 of lifter slot 22.

Figure 5D:
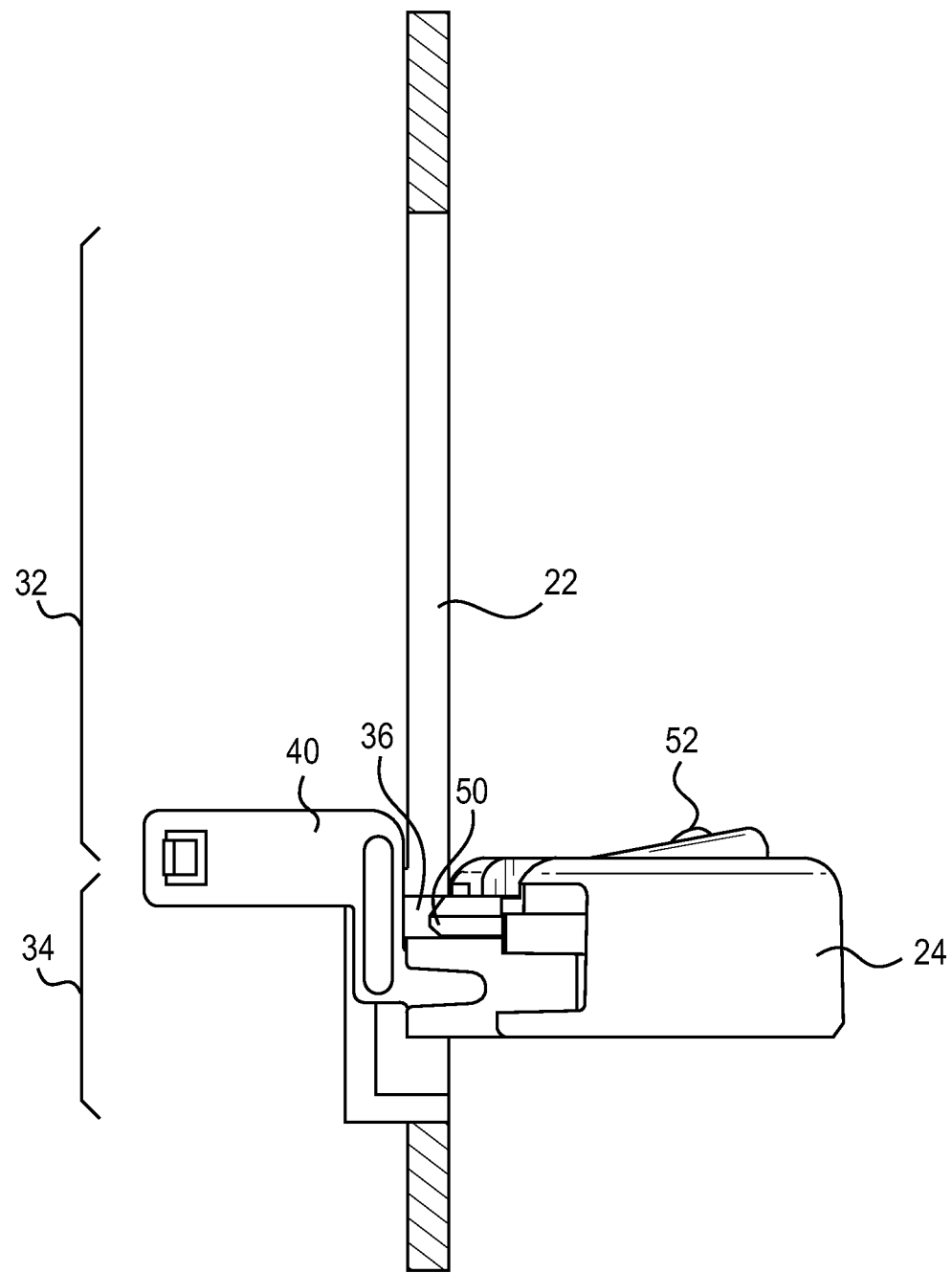

The toaster will perform the toasting operation as described above. When the toasting operation is complete and the bread tray 26 is released by the electromagnet 46, the bread tray 26 begins to move upward. However, the upward movement of the bread tray 26 is stopped by the keep-warm retention device. Specifically, because the sliding tab 50 is too wide to fit into the upper portion 34 of the lifter slot 22, the upward movement of the bread tray 26 is stopped when the sliding tab 50 hits the bottom end of the upper portion 34 of the lifter slot 22. In this position, the top of the lifter arm 40 abuts the bottom end of the upper portion 34 of the lifter slot 22, thereby preventing the bread tray 26, the lifter arm 40, and the lifter knob 24 from rising any higher. This position at which the upward movement of the bread tray 26 is stopped is termed the keep-warm position, and is illustrated in FIG. 5D. The keep-warm position corresponds to the point at which the lower portion 34 and the upper portion 32 of the lifter arm slot 22 meet. The upward bias of the bread tray 26, coupled with the limit of the upward movement provided by the inability of the sliding tab 50 to enter the upper portion 34 of the lifter slot 22, retains the bread tray 26 at the keep-warm position until the user disengages the keep-warm retention device. As discussed above, most or all of the bread slice (now toast) in the bread tray 26 is within the housing 12 while the bread tray 26 is retained at the keep-warm position, thereby enabling the residual heat that remains within the housing 12 (even after power is removed from the heating elements) to help keep the toast warm.

When the user is ready to remove the toast from the toaster after using the keep-warm feature, the user disengages the keep-warm retention device by moving the sliding body 52 away from the lifter arm 40 (i.e., rightward in FIG. 5). This movement of the lifting body 52 causes the sliding tab 50 to also move in the same direction, such that the distal end of the sliding tab 50 is removed from the cavity 36 of the lower portion 34 of the lifter slot 22. Now that the sliding tab 50 is no longer preventing the biased upward movement of the bread tray 26, the bread tray 26 returns to the up position such that the user may remove the toast.

Figure 6:
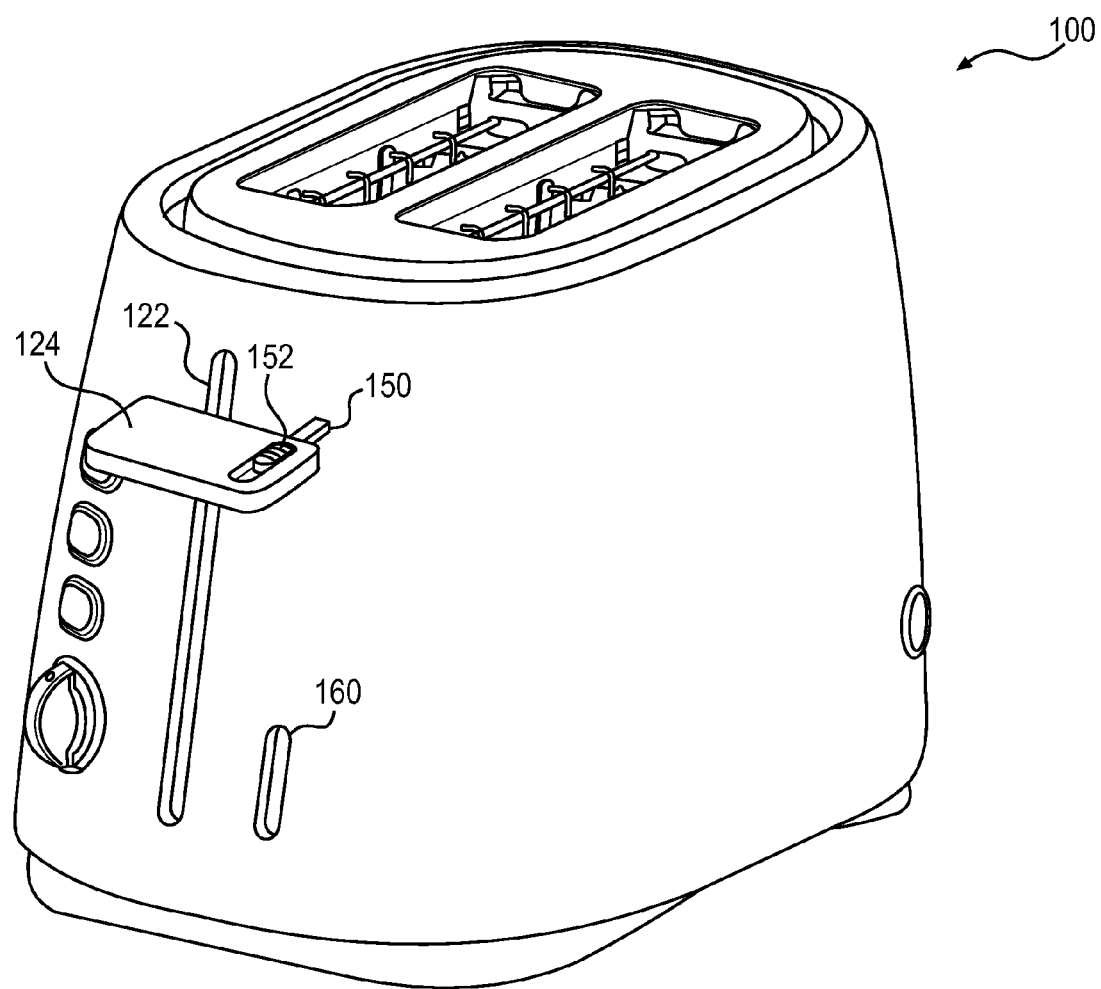
FIG. 6 is an isometric view of a toaster, in accordance with alternative embodiments of the invention.

In alternative embodiments of the invention, a toaster may comprise a bread tray partial retaining mechanism that comprises a protrusion on either the lifter knob or the lifter arm that selectively engages with a corresponding protrusion or void on the housing to selectively retain the at least one bread tray in a position between the down position and the up position after the at least one bread tray is released by the bread tray retaining mechanism. Referring now to FIG. 6, a toaster is illustrated in accordance with alternative embodiments of the invention. Toaster 100 comprises a keep-warm retention device. The keep-warm retention device of the toaster 100 comprises a retaining slot 160 defined in the side surface of the housing parallel to the lifter arm slot 122. The retaining slot 160 has a length that is shorter than a length of the lifter arm slot 122. The bottom end of the retaining slot 160 generally corresponds with the bottom end of the lifter arm slot 122 and/or the position of the lifter knob 124 when the bread tray (not illustrated) is in the bottom position. The bottom end of the retaining slot 160 generally corresponds with the keep-warm position. The lifter knob 124 comprises a sliding latch 152 with a distal end 150 configured for selective insertion into the retaining slot. In a similar fashion to the toaster 10 described above, a user who wishes to engage the keep-warm mechanism of the toaster 100 pushes the lifter knob 124 down to the bottom position and slides the sliding latch 152 toward the toaster housing such that the distal end 150 is inserted in the retaining slot 160. When the toaster cycle is complete and the bread tray is released, the rise of the bread tray will be stopped when the distal end 150 hits the top end of the retaining slot 160, thereby keeping the bread tray in the keep-warm position until the user slides the sliding latch 152 away from the toaster housing to remove the distal end 150 from the retaining slot 160.

Figure 7:
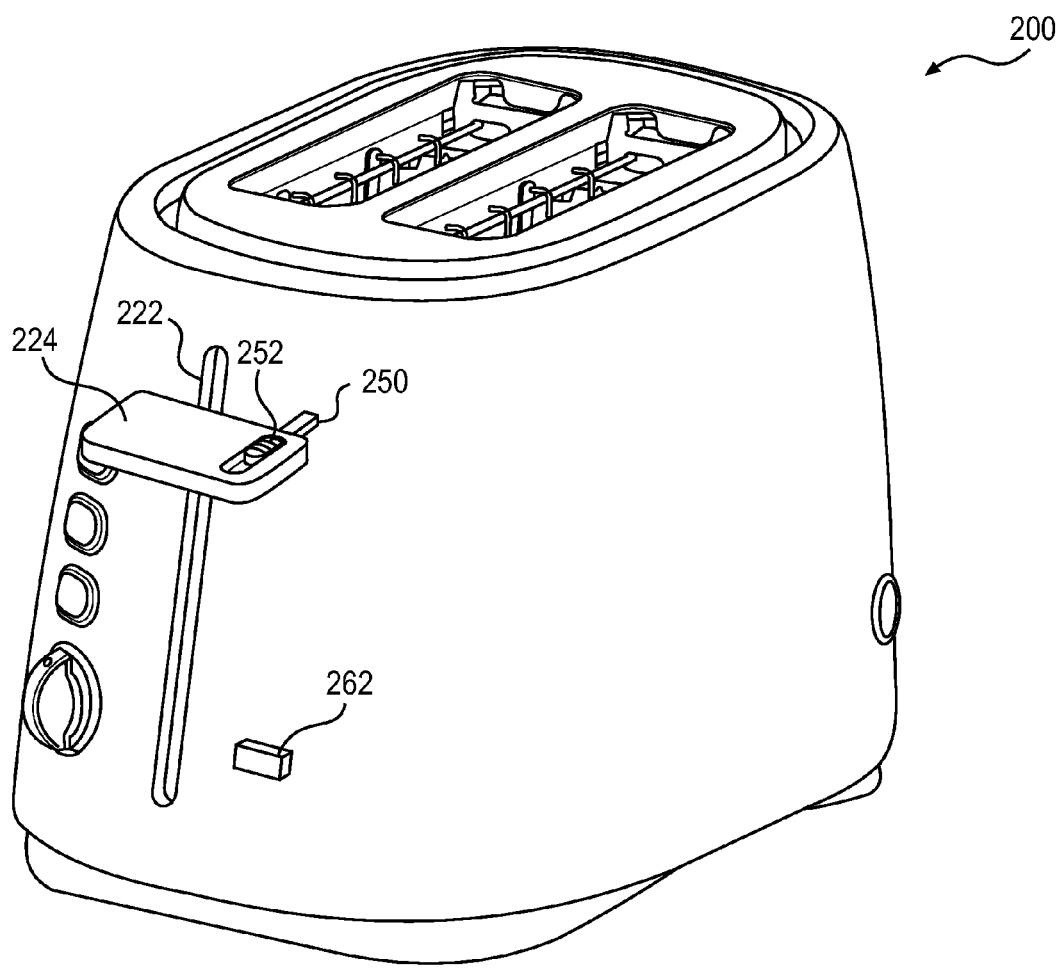
FIG. 7 is an isometric view of a toaster, in accordance with alternative embodiments of the invention.

Referring now to FIG. 7, a toaster is illustrated in accordance with alternative embodiments of the invention. Toaster 200 comprises a keep-warm retention device. The keep-warm retention device of the toaster 200 comprises a protrusion 262 on the side surface of the housing adjacent the lifter arm slot 222. The position of the protrusion 262 generally corresponds with the keep-warm position. The lifter knob 224 comprises a sliding latch 252 with a distal end 250 configured for selective engagement with the protrusion 262. In a similar fashion to the toaster 10 described above, a user who wishes to engage the keep-warm mechanism of the toaster 200 pushes the lifter knob 224 down to the bottom position and slides the sliding latch 252 toward the toaster housing. When the toaster cycle is complete and the bread tray is released, the rise of the bread tray will be stopped when the distal end 250 hits the underside of the protrusion 262, thereby keeping the bread tray in the keep-warm position until the user slides the sliding latch 252 away from the toaster housing such that the distal end 150 is clear of the protrusion 262. While FIG. 7 illustrates a sliding latch that is generally perpendicular to the end wall of the toaster (i.e., that slides toward and away from the toaster housing), alternative embodiments of the present disclosure may comprise a sliding latch that is generally parallel with the end wall of the toaster.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

That which is claimed:

1. A toaster comprising:
   a housing having at least one bread-receiving slot defined in a top surface;
   at least one spring-loaded bread tray, movable between an up position and a down position and biased toward the up position, the at least one bread tray having an open top aligned with the at least one bread-receiving slot;
   one or more heating elements selectively applying heat to a bread slice in the bread tray during a toasting operation;
   a bread tray retaining mechanism selectively retaining the at least one bread tray in the down position while the toasting operation is in progress and for releasing the at least one bread tray from the down position when the toasting operation is complete;
   a lifter arm slot defined in a side surface of the housing, the lifter arm slot comprising an upper portion and a lower portion, the lower portion being wider than the upper portion; and
   a bread tray partial retaining mechanism comprising a sliding tab sized for selective insertion into the lower portion of the lifter arm slot and sized to not fit into the upper portion of the lifter arm slot, the bread tray partial retaining mechanism selectively retaining the at least one bread tray in a position between the down position and the up position.

2. The toaster of claim 1, wherein the position between the down position and the up position at which the bread tray partial retaining mechanism is configured to retain the at least one bread tray is selected such that most or all of the bread slice in the bread tray is within the housing while the bread tray is retained at the position.

3. The toaster of claim 1, wherein the bread tray partial retaining mechanism has an engaged position and a disengaged position; wherein the bread tray partial retaining mechanism retains the at least one bread tray in the position between the down position and the up position when the bread tray partial retaining mechanism is in the engaged position; and wherein the bread tray partial retaining mechanism does not retain the at least one bread tray in the position between the down position and the up position when the bread tray partial retaining mechanism is in the disengaged position, thereby enabling the bread tray to return to the up position.

4. The toaster of claim 1, wherein the sliding tab prevents the bread tray's return to the up position from the down position when the sliding tab is selectively inserted into the lower portion of the lifter arm slot.

5. The toaster of claim 4, further comprising:
   a lifter bracket located within the housing and affixed to the at least one bread tray;
   a lifter knob located external to the housing, the lifter knob comprising the sliding tab; and
   a lifter arm having a first end affixed to the lifter bracket, a second end affixed to the lifter knob, and a connecting portion therebetween, the connecting portion configured to pass through the lifter arm slot.

6. The toaster of claim 4, further comprising:
   a lifter bracket located within the housing and affixed to the at least one bread tray;
   a lifter knob located external to the housing; and
   a lifter arm having a first end affixed to the lifter bracket, a second end affixed to the lifter knob, and a connecting portion therebetween, the connecting portion configured to pass through the lifter arm slot;
   wherein the sliding tab is slidably affixed to one of the lifter knob or the lifter arm.

7. The toaster of claim 4, wherein the lifter bracket comprises a metal plate and wherein the bread tray retaining mechanism comprises an electromagnet that is energized during the toasting operation and thereby attracts the metal plate.

8. The toaster of claim 1, wherein the position between the down position and the up position corresponds to a point at which the lower portion and the upper portion of the lifter arm slot meet.

9. A toaster comprising:
   a housing having at least one bread-receiving slot defined in a top surface and a lifter arm slot defined in a side surface, the lifter arm slot comprising an upper portion and a lower portion, the lower portion being wider than the upper portion;
   at least one spring-loaded bread tray, movable between an up position and a down position and biased toward the up position, the at least one bread tray having an open top aligned with the at least one bread-receiving slot;
   one or more heating elements selectively applying heat to a bread slice in the bread tray during a toasting operation;
   a lifter bracket located within the housing and affixed to the at least one bread tray, the lifter bracket having at least one metal surface;
   a lifter knob located external to the housing;
   a lifter arm having a first end affixed to the lifter bracket, a second end affixed to the lifter knob, and a connecting portion therebetween, the connecting portion configured to pass through the lifter arm slot;
   an electromagnet selectively retaining the at least one bread tray in the down position while the toasting operation is in progress and releasing the at least one bread tray from the down position when the toasting operation is complete, the electromagnet being energized during the toasting operation and thereby magnetically retaining the metal surface of the lifter bracket; and
   a sliding tab having a distal end sized for selective insertion into the lower portion of the lifter arm slot and sized to not fit into the upper portion of the lifter arm slot such that the bread tray cannot return to the up position from the down position when the sliding tab is inserted into the lower portion of the lifter arm slot.

10. The toaster of claim 9, wherein the position between the down position and the up position at which the sliding tab is configured to retain the at least one bread tray is selected such that most or all of the bread slice in the bread tray is within the housing while the bread tray is retained at the position.

11. The toaster of claim 9, wherein the sliding tab has an engaged position and a disengaged position; wherein the sliding tab retains the at least one bread tray in the position between the down position and the up position when the sliding tab is in the engaged position; and wherein the sliding tab does not retain the at least one bread tray in the position between the down position and the up position when the sliding tab is in the disengaged position, thereby enabling the bread tray to return to the up position.

12. The toaster of claim 11, wherein the distal end of the sliding tab is selectively inserted into the lower portion of the lifter arm slot when the sliding tab is in the engaged position.

13. The toaster of claim 9, wherein the position between the down position and the up position corresponds to a point at which the lower portion and the upper portion of the lifter arm slot meet.

14. The toaster of claim 9, wherein the sliding tab is slidably affixed to one of the lifter knob or the lifter arm.

15. A toaster comprising:
a housing having at least one bread-receiving slot defined in a top surface;
at least one spring-loaded bread tray, movable between an up position and a down position and biased toward the up position, the at least one bread tray having an open top aligned with the at least one bread-receiving slot;
one or more heating elements selectively applying heat to a bread slice in the bread tray during a toasting operation;
a lifter arm slot defined in a side surface of the housing;
a lifter bracket located within the housing and affixed to the at least one bread tray;
a lifter knob located external to the housing; and
a lifter arm having a first end affixed to the lifter bracket, a second end affixed to the lifter knob, and a connecting portion therebetween, the connecting portion configured to pass through the lifter arm slot;
a bread tray retaining mechanism selectively retaining the at least one bread tray in the down position while the toasting operation is in progress and for releasing the at least one bread tray from the down position when the toasting operation is complete; and
a bread tray partial retaining mechanism selectively retaining the at least one bread tray in a position between the down position and the up position after the at least one bread tray is released by the bread tray retaining mechanism, the bread tray partial retaining mechanism comprising a sliding tab that is slidably affixed on either the lifter knob or the lifter arm that selectively engages with a corresponding protrusion or void on the housing to selectively retain the at least one bread tray in a position between the down position and the up position after the at least one bread tray is released by wherein the lifter arm slot comprises an upper portion and a lower portion, the lower portion being wider than the upper portion; wherein the protrusion or void on the housing comprises the lower portion of the lifter arm slot; and the sliding tab having a distal end sized for selective insertion into the lower portion of the lifter arm slot only.

* * * * *